United States Patent
McEwan

Patent Number: 5,883,591
Date of Patent: Mar. 16, 1999

[54] ULTRA-WIDEBAND IMPEDANCE SENSOR

[75] Inventor: Thomas E. McEwan, Livermore, Calif.

[73] Assignee: The Regents of the University of California, Oakland, Calif.

[21] Appl. No.: 31,839

[22] Filed: Feb. 27, 1998

[51] Int. Cl.$^6$ .................................................. G01S 13/00
[52] U.S. Cl. ............................................. 342/22; 342/89
[58] Field of Search ................................. 342/22, 27, 89, 342/118, 124

[56] References Cited

U.S. PATENT DOCUMENTS

| | | |
|---|---|---|
| 5,345,471 | 9/1994 | McEwan ........................................ 375/1 |
| 5,457,394 | 10/1995 | McEwan ..................................... 342/22 |
| 5,517,198 | 5/1996 | McEwan ..................................... 342/89 |
| 5,523,760 | 6/1996 | McEwan ..................................... 342/89 |
| 5,581,256 | 12/1996 | McEwan ..................................... 342/27 |
| 5,610,611 | 3/1997 | McEwan ..................................... 342/89 |
| 5,805,110 | 9/1998 | McEwan ..................................... 342/22 |

*Primary Examiner*—Daniel T. Pihulic
*Attorney, Agent, or Firm*—Henry P. Sartorio

[57] ABSTRACT

The ultra-wideband impedance sensor (UWBZ sensor, or Z-sensor) is implemented in differential and single-ended configurations. The differential UWBZ sensor employs a sub-nanosecond impulse to determine the balance of an impedance bridge. The bridge is configured as a differential sample-and-hold circuit that has a reference impedance side and an unknown impedance side. The unknown impedance side includes a short transmission line whose impedance is a function of the near proximity of objects. The single-ended UWBZ sensor eliminates the reference side of the bridge and is formed of a sample and hold circuit having a transmission line whose impedance is a function of the near proximity of objects. The sensing range of the transmission line is bounded by the two-way travel time of the impulse, thereby eliminating spurious Doppler modes from large distant objects that would occur in a microwave CW impedance bridge. Thus, the UWBZ sensor is a range-gated proximity sensor. The Z-sensor senses the near proximity of various materials such as metal, plastic, wood, petroleum products, and living tissue. It is much like a capacitance sensor, yet it is impervious to moisture. One broad application area is the general replacement of magnetic sensors, particularly where nonferrous materials need to be sensed. Another broad application area is sensing full/empty levels in tanks, vats and silos, e.g., a full/empty switch in water or petroleum tanks.

20 Claims, 2 Drawing Sheets

ULTRA-WIDEBAND IMPEDANCE SENSOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

The invention relates generally to ultra-wideband sensors, and more particularly to ultra-wideband range-gated proximity sensors.

U.S. Pat. No. 5,345,471 by McEwan describes an ultra-wideband (UWB) receiver which has both differential and single-ended configurations. The UWB receiver is range-gated and has a variety of micropower impulse radar applications, including motion sensing (U.S. Pat. No. 5,361,070), hidden object locators (U.S. Pat. Nos. 5,457,394 and 5,512,834), and medical monitoring (U.S. Pat. No. 5,573,012). U.S. Pat. No. 5,609,059 describes a guided wire micropower impulse radar system for material level sensing. U.S. patent application Ser. No. 08/379,044 describes an RF switch for material level sensing. U.S. Pat. No. 5,521,600 desribes a range gated field disturbance sensor and U.S. Pat. No. 5,581,256 describes a range gated strip proximity sensor.

It is desirable to have a simple, low cost UWB sensor which can detect changes in impedance to replace conventional impedance sensors for use in a variety of applications. Magnetic proximity sensors are useless where nonferrous materials are to be sensed. Capacitive sensors are affected by interferences, e.g., moisture. Conventional microwave CW impedance bridges can be affected by spurious Doppler modes from large distant objects.

SUMMARY OF THE INVENTION

Accordingly, it is an object of the invention to provide an ultra-wideband impedance (UWBZ) sensor.

It is also an object of the invention to provide a range-gated UWBZ sensor.

It is another object of the invention to provide a range-gated UWBZ sensor with either a differential or single ended configuration.

The ultra-wideband impedance sensor (UWBZ sensor, or Z-sensor) is implemented in differential and single-ended configurations. The differential UWBZ sensor employs a sub-nanosecond impulse to determine the balance of an impedance bridge. The bridge is configured as a differential sample-and-hold circuit that has a reference impedance side and an unknown impedance side. The unknown impedance side includes a short transmission line whose impedance is a function of the near proximity of objects. The single-ended UWBZ sensor eliminates the reference side of the bridge and is formed of a sample and hold circuit having a transmission line whose impedance is a function of the near proximity of objects. The sensing range of the transmission line is bounded by the two-way travel time of the impulse, thereby eliminating spurious Doppler modes from large distant objects that would occur in a microwave CW impedance bridge. Thus, the UWBZ sensor is a range-gated proximity sensor.

The Z-sensor senses the near proximity of various materials such as metal, plastic, wood, petroleum products, and living tissue. It is much like a capacitance sensor, yet it is impervious to moisture. One broad application area is the general replacement of magnetic proximity sensors, particularly where nonferrous materials need to be sensed. Another broad application area is sensing full/empty levels in tanks, vats and silos, e.g., a full/empty switch in water or petroleum tanks.

DETAILED DESCRIPTION OF THE INVENTION

Figure 1:
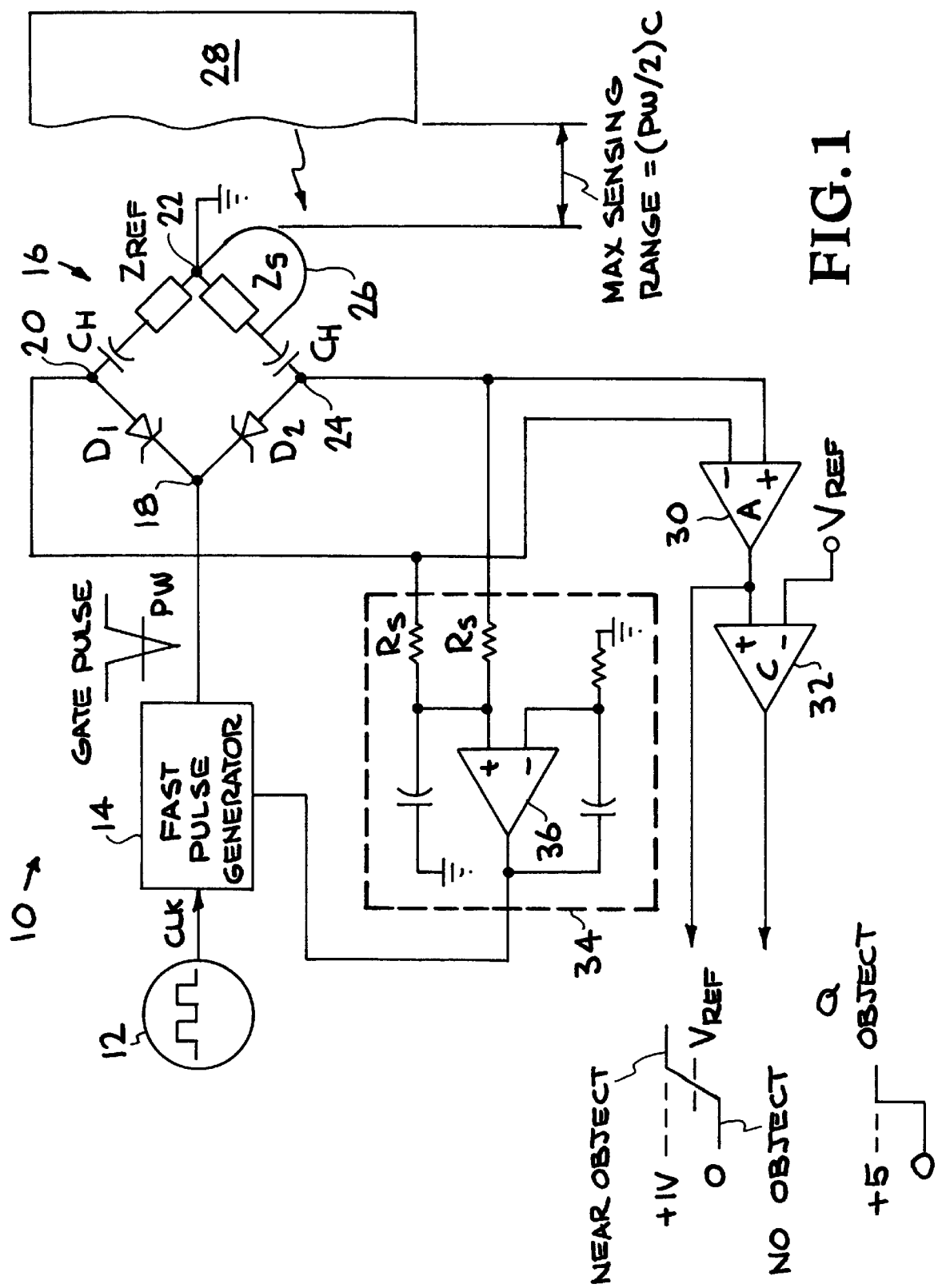
FIG. 1 is a schematic diagram of a differential UWBZ sensor.

FIG. 1 depicts the general configuration for a differential ultra-wideband impedance (UWBZ) sensor 10. A pulse repetition frequency (PRF) generator 12 typically comprised of a CMOS RC oscillator, generates a sequence of pulses at a PRF frequency, e.g., 0 to +5 V squarewaves at 2 MHz. The PRF generator 12 drives a fast pulse generator 14 which typically comprises a common emitter microwave silicon bipolar transistor operating as a fast switch. The transistor output is differentiated by an RC network into a short gate pulse, typically 200 ps wide. The gate pulses are applied to a differential sampling impedance bridge 16. Bridge 16 is formed between four nodes 18, 20, 22, 24. A first Schottky diode $D_1$ is connected between nodes 18 and 20, with the cathode connected to node 18. A second Schottky diode $D_2$ is connected between nodes 18 and 24, with the cathode connected to node 18. A charge holding capacitor $C_H$ and series impedance $Z_{ref}$ are connected between nodes 20 and 22. Another charge holding capacitor $C_H$ and series impedance $Z_S$ are connected between nodes 24 and 22. Node 22 is connected to ground. A sampling loop, wire, or line 26 is connected in parallel across impedance $Z_S$. The impedance of transmission line 26 is a function of the near proximity of objects. When sensor loop 26 of differential sampling bridge 16 is brought into proximity with an object 28, the outputs from bridge 16 at nodes 20 and 24 are input into a differential amplifier (A) 30.

The differential sampling bridge is essentially the same as the differential receiver described in U.S. Pat. No. 5,345,471 by McEwan, which is herein incorporated by reference. The major difference is that the UWB input termination resistors in the receiver are replaced with impedances $Z_{ref}$ and $Z_S$, typically inductances on the order of 10 nH. Resistances may also be used, but inductances (typically a ½" length of wire connected directly to ground) provide natural filtering against RF interference.

The output of the sampling bridge 16 is a DC level, or low frequency signal if the object 28 is moving, that is differentially amplified (as in the receiver) by amplifier (A) 30 to provide an analog output voltage that is related to the degree of sampling bridge imbalance caused by the proximity of the object 28. In other words, if $Z_{ref}$ does not equal the net impedance of $Z_S$ in parallel with the impedance of the sampling wire 26, either $D_1$ or $D_2$ will conduct the gate pulse harder, providing an imbalanced average DC output voltage. Note that the impedances are sensed only during the brief (~200 ps) conduction times of $D_1$, $D_2$—hence the name ultra-wideband impedance sensor. Another output device can be used in place of A.

Metal objects cause the largest output voltage, and a human hand produces almost as much signal. A fir 2×4 or a quart of motor oil produce about ½ as much signal. A thin sheet (<0.1" thick) of plastic produces very little signal, and that signal is about the same if the plastic is coated with a sheet of water (a significant feature is high moisture tolerance)—the UWBZ sensor responds to the bulk of a material.

The analog output of amplifier (A) 30 can be input into a comparator (C) 32, along with a reference voltage $V_{ref}$, to provide a digital indication of object proximity. The reference voltage $V_{ref}$ allows for adjustment of range-to-object.

One practical problem is the large common-mode voltage appearing at the input to amplifier (A) 30. Typically, about −500 mV of DC voltage will appear at the + and − input terminals of A. This voltage is the result of gate pulse drive to diodes $D_1$, $D_2$ at the PRF rate, causing them to conduct and place an average DC voltage across charge-holding capacitors $C_H$. Impressed on top of this −500 mV level is the signal level resulting from the proximity of a nearby object 28 which may be less than 10 mV; one side of the bridge may go to −505 mV and the other to −495 mV. Thus, the common-mode rejection of A needs to be quite high to accurately subtract the common −500 mV. Also, variations in the bridge drive level can be substantial. For example, a 10% change in gate pulse width PW will result in ~50 mV change in the common mode voltage.

The solution to the common mode problem is to regulate the drive level to the bridge, and further, to force the common mode DC voltage from the bridge to equal zero, thereby eliminating common mode voltages from the input to A. A further advantage to this approach is that the average DC voltage across the Schottky barrier sampling diodes $D_1$ and $D_2$ is zero, eliminating leakage problems that could unbalance the bridge output. To implement the common mode regulator, a control loop is applied that uses a summing integrator to sense common mode deviations from zero and to control the output amplitude of the fast pulse generator that drives the bridge. A common mode control amplifier 34 is connected between the output nodes 20, 24 of the bridge 16 and fast pulse generator 14 to control the amplitude of the gate pulses.

The common mode control amplifier 34 employs a high gain operational amplifier (op amp) 36 in a differential integrator configuration. The positive (+) input receives the common mode voltage through a pair of equal-value summing resistors, $R_S$, each of which is connected to a respective output node 20 or 24 of bridge 16, and the negative (−) input is referenced to ground, or zero volts. If the + input swings positive, indicating low bridge drive, the integrator output swings positive to increase the drive level and correct the error.

Figure 2:
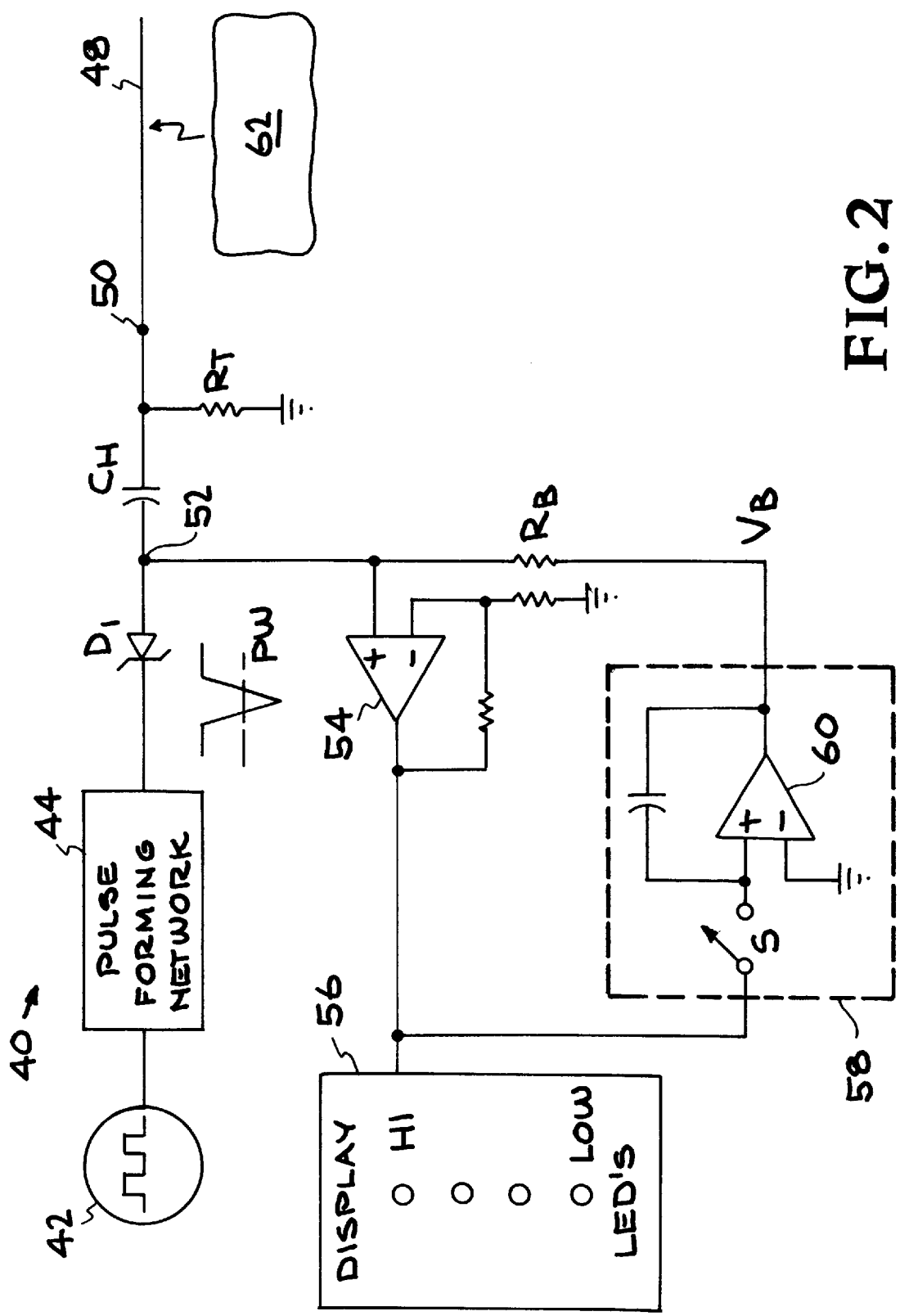
FIG. 2 is a schematic diagram of a single-ended UWBZ sensor.

FIG. 2 shows a single-ended UWBZ sensor 40. Sensor 40 is formed of a PRF generator 42 (similar to PRF generator 12) which drives a pulse forming network (PFN) 44 which produces a sequence of gate pulses having a pulse width PW, e.g., 2 ns, which are input into a single-ended sampler 46. Sampler 46 is formed of a Shottky diode $D_1$ having its cathode connected to PFN 44, a charge holding capacitor $C_H$ and a transmission line 48 (monopole sensor), typically a wire 4–18" long, all connected in series. Node 50 between $C_H$ and line 48 is also connected to ground through $R_T$. The impedance of line 48 will vary as a function of the proximity of an object 62 and will produce changes in the sampler output voltage. The output from sampler 46, at node 52 between $D_1$ and $C_H$ is input into an amplifier (A) 54, whose output is input into a display 56, typically an LED display. A single-ended sampler is also described in the above referenced receiver patent. The single-ended UWBZ sensor 40 has a large "normal mode" voltage appearing across $C_H$ due to the conduction of $D_1$ at the PRF (~2 MHz). A power-on baseline control or reset circuit 58 is used to subtract the normal mode voltage. This process, as well as the general operation of the amplifier A and hand-held LED display, is described in U.S. Pat. No. 5,547,394, "Impulse Radar Studfinder" by McEwan, which is herein incorporated by reference.

To accomplish normal mode voltage subtraction, a baseline control or reset circuit 58 is connected between the output and input of amplifier A. Circuit 58 comprises a switched high-gain integrator referenced to ground. The integrator is formed of an operational amplifier (op amp) 60 with its output connected back through a capacitor to its positive input and its negative input connected to ground. At power-up, a control switch S is closed that allows the feedback action of the integrator 60 to swing the output of A to zero. The normal mode voltage is servoed to zero via a bias voltage $V_B$ from circuit 58 that sets the average current to the detector circuit $D_1$, $C_H$ such that the average voltage across $C_H$ is zero. About 100 ms after power-up, the control switch S to the integrator 60 opens, leaving a steady correction voltage $V_B$ that remains across the integrator 60 for a period of hours before bleeding off through various leakage paths, such as input bias current to the integrator.

While $V_B$ remains steady, the entire Z-sensor 40 can be moved into near proximity of materials to sense their presence. When powered-up in near proximity to a wall, sensor impedance deviations due to the wall are zeroed out. As the sensor is moved across the wall, underlying objects such as pipes and wood studs will produce a thermometer-like signal strength indication on the LED display 56.

Generally, the sensing distance is limited to ½ the pulse width (PW). Thus, the length L of the sensor wire 48 need not be longer than L=(PW/2) c, where c=speed of light. The sensing region is limited by time-of-flight travel to a total distance, or radius, L from the sampler. The distance L may include some travel down the wire and some distance radial to the wire.

A potential application of the Z-sensor is the location of buried wires and pipes. Here it is desirable to use a long, linear sensor for orientation preferential sensing. The Z-sensor with a long monopole antenna (3–6 feet) is an excellent candidate because of good polarization sensitivity.

Under certain configurations of the sensor wire, the capacitive and inductive contributions to the net impedance can be made to favor either metallic or non-metallic objects. Further, the bridge imbalance can be one polarity for metal and the opposite polarity for water based objects, thus allowing automatic classification in automated industrial control; or it can be balanced to not respond to metallic objects while providing good response to the human hand or water tanks.

Changes and modifications in the specifically described embodiments can be carried out without departing from the scope of the invention which is intended to be limited only by the scope of the claims.

The invention claimed is:

1. An ultra-wideband impedance (UWBZ) sensor, comprising:
   a pulse generator for producing ultra-wideband gating pulses;
   an ultra-wideband sampler connected to the pulse generator which samples during the gating pulses;
   a transmission line whose impedance is a function of the near proximity of objects, connected to the sampler to produce changes in sampler output caused by changes in impedance of the transmission line caused by the near proximity of objects to the transmission line;

an output device connected to the sampler output to provide an output signal;

wherein the sensing range is determined by half the pulsewidth of the gating pulses.

2. The UWBZ sensor of claim 1 wherein the output device is an amplifier.

3. The UWBZ sensor of claim 1 wherein the sampler is a single ended sampler.

4. The UWBZ sensor of claim 3 wherein the single ended sampler comprises a Schottky diode having its cathode connected to the pulse generator, and a charge holding capacitor connected between the anode of the Schottky diode and the transmission line.

5. The UWBZ sensor of claim 4 wherein the output device is an amplifier.

6. The UWBZ sensor of claim 5 wherein the amplifier is connected to the anode of the Schottky diode and further comprising a baseline control or reset circuit connected between the output and input of the amplifier.

7. The UWBZ sensor of claim 3 wherein the pulse generator comprises a pulse repetion frequency (PRF) generator and a pulse forming network (PFN) connected to the PRF generator.

8. The UWBZ sensor of claim 1 wherein the sampler is a differential sampler.

9. The UWBZ sensor of claim 8 wherein the differential sampler comprises a differential sampling impedance bridge having a reference impedance side and an unknown impedance side, the transmission line being connected to the unknown impedance side, and the output device is a differential amplifier having a first input connected to the reference impedance side and a second input connected to the unknown impedance side.

10. The UWBZ sensor of claim 9 wherein the reference impedance side comprises in series, a first Schottky diode having its cathode connected to the pulse generator, a first charge holding capacitor connected to the anode of the first Schottky diode, and a reference impedance connected between the first charge holding capacitor and ground, and the unknown impedance side comprises in series, a second Schottky diode having its cathode connected to the pulse generator, a second charge holding capacitor connected to the anode of the second Schottky diode, and a sensor impedance connected between the second charge holding capacitor and ground, the transmission line being connected in parallel across the sensor impedance, the first input of the differential amplifier being connected to the anode of the first Schottky diode and the second input of the differential amplifier being connected to the anode of the second Schottky diode.

11. The UWBZ sensor of claim 9 further comprising a common mode control amplifier having inputs connected to the reference impedance side and unknown impedance side and an output connected to the pulse generator to control the amplitude of the gate pulses to force the common mode DC voltage from the bridge to zero.

12. A differential ultra-wideband impedance (UWBZ) sensor, comprising:

a pulse repetition frequency (PRF) generator for producing a sequence of PRF pulses;

a gating pulse generator connected to the PRF generator for producing ultra-wideband gating pulses;

a differential sampling impedance bridge comprising first, second, third and fourth nodes, the first node being connected to the gating pulse generator, a first Schottky diode having its cathode connected to the first node and its anode to the second node, a first charge holding capacitor and a reference impedance connected in series between the second node and the third node, the third node being connected to ground, a second Schottky diode having its cathode connected to the first node and its anode to the fourth node, a second charge holding capacitor and a sensor impedance connected in series between the fourth node and third node;

a transmission line whose impedance is a function of the near proximity of objects, connected in parallel across the sensor impedance;

a differential amplifier having a first input connected to the second node and a second input connected to the fourth node to detect sampling bridge imbalance caused by the near proximity of objects to the transmission line;

wherein the sensing range is determined by half the pulsewidth of the gating pulses.

13. The UWBZ sensor of claim 12 further comprising a common mode control amplifier having inputs connected to the second and fourth nodes and an output connected to the gating pulse generator to control the amplitude of the gate pulses to force the common mode DC voltage from the bridge to zero.

14. The UWBZ sensor of claim 13 wherein the common mode control amplifier comprises an operational amplifier in differential integrator configuration having its positive input connected through summing resistors to the second and fourth nodes, and its negative input to ground.

15. The UWBZ sensor of claim 12 wherein the reference and sensor impedances are inductances.

16. The UWBZ sensor of claim 12 further comprising a comparator having a first input connected to the amplifier and a second input connected to a reference voltage which sets the range to the object.

17. A single-ended ultra-wideband impedance (UWBZ) sensor, comprising:

a pulse repetition frequency (PRF) generator for producing a sequence of PRF pulses;

a pulse forming network (PFN) connected to the PRF generator for producing ultra-wideband gating pulses;

a single ended sampler comprising a Schottky diode having its cathode connected to the PFN, and a charge holding capacitor connected to the anode of the Schottky diode;

a transmission line whose impedance is a function of the near proximity of objects, connected to the charge holding capacitor;

an amplifier having an input connected to the anode of the Schottky diode to detect changes in sampler output caused by the near proximity of objects to the transmission line;

wherein the sensing range is determined by half the pulsewidth of the gating pulses.

18. The UWBZ sensor of claim 17 further comprising a baseline control or reset circuit connected between the output and input of the amplifier.

19. The UWBZ sensor of claim 18 wherein the baseline control or reset circuit comprises a switched high gain integrator referenced to ground.

20. The UWBZ sensor of claim 19 wherein the switched high gain integrator referenced to ground comprises an operational amplifier having its output connected through a capacitor to its positive input, and its negative input connected to ground, and a control switch connected to its positive input.

* * * * *